No. 622,060. Patented Mar. 28, 1899.
J. A. MURPHY & A. D. ROWE.
PNEUMATIC TIRE.
(Application filed July 20, 1898.)

(No Model.)

Witnesses:
Inventors
James A. Murphy and Amos D. Rowe
by Chapin & Co.
Attorneys

THE NORRIS PETERS CO., PHOTO-LITHO., WASHINGTON, D. C.

UNITED STATES PATENT OFFICE.

JAMES A. MURPHY AND AMOS D. ROWE, OF HOLYOKE, MASSACHUSETTS, ASSIGNORS OF ONE-THIRD TO CHARLES H. MORGAN, OF SAME PLACE.

PNEUMATIC TIRE.

SPECIFICATION forming part of Letters Patent No. 622,060, dated March 28, 1899.

Application filed July 20, 1898. Serial No. 686,429. (No model.)

*To all whom it may concern:*

Be it known that we, JAMES A. MURPHY and AMOS D. ROWE, citizens of the United States of America, residing at Holyoke, in the county of Hampden and State of Massachusetts, have invented new and useful Improvements in Pneumatic Tires, of which the following is a specification.

This invention relates to pneumatic tires for vehicles, and more especially to the construction of a detachable protective shoe for tires of this class, whereby the inner air-receiving tube, of comparatively light construction, may be protected against puncturing when in use by a flexible shoe placed over it when in a deflated or partially-deflated condition and secured firmly thereto by the inflation of the said inner tube; and the invention consists in the construction of the protective shoe, as fully set forth herein and particularly pointed out in the claim.

Figure 1:
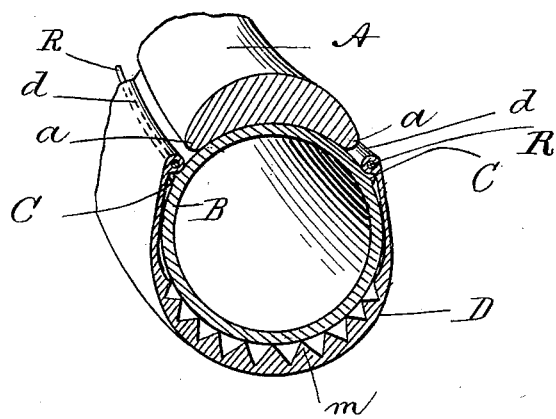
Figure 2:
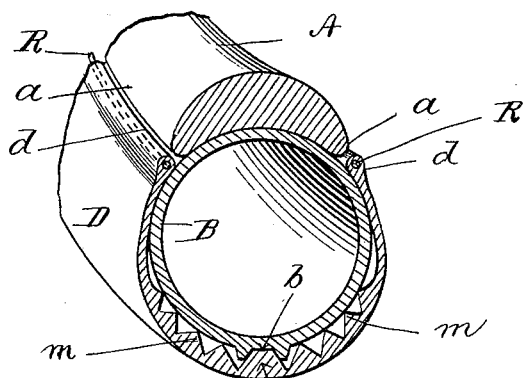
Figure 3:
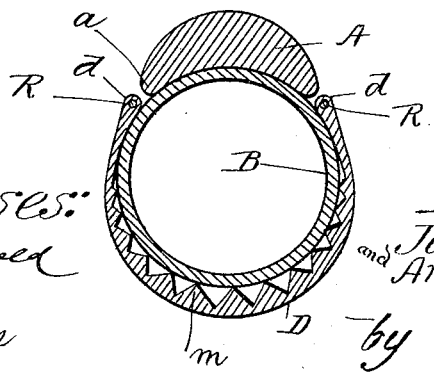

In the drawings forming part of this specification, Figures 1 and 2 are perspective sectional views of a tire and part of the rim of a wheel embodying this invention, Fig. 2 showing a slight modification of the construction shown in Fig. 1. Fig. 3 is a sectional view of a tire, showing a further modification of the construction shown in the other figures.

Referring to the drawings, Fig. 1 shows a portion of a rim A of a wheel, to which is secured by the usual method of attaching single-tube tires the air-receiving tube B. This inner tube or tire, while not made either as light or elastic as the inner tubes of the so-called "clencher-tires," is still not as heavy as the ordinary single-tube tire, which is designed to be used without a protective outer tire, yet it has about the same elastic quality as the latter. A suitable valve of any well-known construction, which it is not deemed necessary to show in the drawings, communicates with said inner tube B through the rim A in the usual manner. Said inner tube B is provided with ribs C, molded on the exterior surface thereof, either near and parallel with the edges *a* of the rim A, as shown in Fig. 1, or, as shown in Fig. 2, said ribs may be placed on the tread part of said inner tube close together, forming thus a narrow channel *b* between them. In either position their purpose and function is the same and will be described farther on.

The inner tube B is protected by a shoe D of tougher and somewhat less elastic material and is made as ordinary single-tube tires are made, of rubber and layers of textile material, and is molded on a form of such shape that normally when removed from the tube its edges *d* will nearly spring together. These edges may be sprung apart and the shoe placed over the tube B when the latter is in a partially-deflated condition, and said inner tube when inflated will expand and its surface be forced against the interior surface of said shoe, as shown in the drawings. The expansion of the inner tube will force the edges *d* of the shoe apart still farther and cause the latter to grip the tube with sufficient force to hold it in place. For providing said shoe D with positively-fixed diameters at the edges *d* thereof wire rings R of less diameter than the diameter of the inner tube B at its center are embedded in said edges *d* of the shoe, as shown in the drawings, and when said shoe is in operative position on the said tube said rings will lie in a position on said tube inside of the largest transverse diameter of said tube, as shown, and as long as said tube B remains in its expanded condition said shoe will be irremovably secured to said tube by reason of the difference in plane diameters between said rings R and said tube, as described.

For the purpose of guarding against a side slipping movement of the wheel, whereby frictional movements might be caused between the surface of the tube B and its shoe D, two ribs C are molded on the surface of the tube B, as stated, and may be placed, as shown in Fig. 1, along each side of the tube B in such position that they will lie near and substantially parallel with the edges *a* of the rim A, leaving sufficient space between said edges and said ribs for receiving the beaded edges *d* of the shoe D. Should said ribs C be located as shown in Fig. 1, then the edges *d* of the shoe D would have the form shown in said figure—viz., they would be molded entirely on the inside of the said edges—whereby they would better engage the ribs C. Should the said ribs be located as in Fig. 2, however, where they serve the same purpose as in the position shown in Fig. 1, said edges d of the shoe would not require the inturned bead on the edges thereof shown in said Fig. 1.

With the ribs C located on the tread side of the tube B, as seen in Fig. 2, the inner surface of the shoe would be provided with a rib C', centrally located thereon and extending entirely around the shoe and fitting closely the channel formed by said two ribs C. The said ribs C, as shown in either Fig. 1 or Fig. 2, provide equally well against the setting up of frictional movements between said tire and said shoe by reason of lateral pressure brought to bear on the said shoe, as in turning a corner.

If desired, the single rib C' may be located on the inner tire or tube B and be made to fit in between two ribs C C, located on the inner surface of the shoe D; but this would be a mere reversal of the construction shown and quite within the scope of the invention, as would also the construction shown in Fig. 3, in which the ribs are omitted altogether.

The preferred construction of the inner surface of said shoe is as shown in the drawings, with the ribs or corrugations m extending entirely around said inner surface of the shoe, against the edges of which corrugations said inner tube will bear. The particular form of the corrugations is immaterial, their object being to increase the distance between the outer surface of the inner tube and the outer surface of the shoe, whereby said inner tube will not be so liable to being punctured as it would be if nearer that part of the tire in contact with the road.

Having thus described our invention, what we claim, and desire to secure by Letters Patent, is—

In a vehicle-wheel, the combination of a rim, an air-receiving tube, a protective shoe of flexible material fitted over said tube, beaded edges on said shoe, wire rings embedded in said edges and having a smaller diameter than the plane diameter of said tube at its greatest transverse diameter, ribs lying on the outer surface of, and concentric with, said tube and extending therearound inside of its greatest transverse diameter, for engagement with the beaded edges of said shoe, parallel interengaging ribs on the outer surface of the tread part of said air-tube, and on the inner surface of said shoe for effecting a separation of the contiguous surfaces of said tube and shoe, and preventing side slip of the latter, substantially as described.

JAMES A. MURPHY.
AMOS D. ROWE.

Witnesses:
K. I. CLEMONS,
HENRY A. CHAPIN.